United States Patent
Graham et al.

(10) Patent No.: US 11,405,126 B1
(45) Date of Patent: Aug. 2, 2022

(54) SIMPLIFIED RADIO FREQUENCY EMISSIONS TESTER AND METHOD OF USE THEREOF

(71) Applicant: Combat Capabilities Development Command, Chemical Biological Center, Apg, MD (US)

(72) Inventors: Colin W Graham, Towson, MD (US); Jefferson M Durham, Forest Hill, MD (US); Jerry Huen, Perry Hall, MD (US)

(73) Assignee: America as Represented by the Secretary of The Army, Washington, DC (US)

( * ) Notice: Subject to any disclaimer, the term of this patent is extended or adjusted under 35 U.S.C. 154(b) by 0 days.

(21) Appl. No.: 17/090,025

(22) Filed: Nov. 5, 2020

Related U.S. Application Data

(60) Provisional application No. 62/932,115, filed on Nov. 7, 2019.

(51) Int. Cl.
*H04K 3/00* (2006.01)
*H04B 17/10* (2015.01)
*G01S 19/01* (2010.01)
*H04B 17/16* (2015.01)

(52) U.S. Cl.
CPC .............. *H04K 3/45* (2013.01); *G01S 19/015* (2013.01); *H04B 17/102* (2015.01); *H04B 17/16* (2015.01); *H04K 2203/22* (2013.01)

(58) Field of Classification Search
CPC .... H04K 3/45; H04K 2203/22; H04B 17/102; H04B 17/16; G01S 19/015
See application file for complete search history.

(56) References Cited

U.S. PATENT DOCUMENTS

| | | | |
|---|---|---|---|
| 8,116,706 B1* | 2/2012 | Clement | H04B 1/1027 455/179.1 |
| 2007/0042739 A1* | 2/2007 | Gruhle | G01R 29/10 455/277.2 |
| 2013/0214167 A1* | 8/2013 | Grinberg | H04N 17/002 250/353 |
| 2018/0287650 A1* | 10/2018 | Mercer | H04W 52/34 |
| 2019/0140738 A1* | 5/2019 | Zeng | H04B 10/07 |
| 2020/0084638 A1* | 3/2020 | Kronewitter, III | H04W 16/18 |

* cited by examiner

*Primary Examiner* — Nhan T Le
(74) *Attorney, Agent, or Firm* — Ulysses John Biffoni

(57) ABSTRACT

A testing device is provided that evaluates the operating performance of radio frequency (RF) emitting devices such as a counter-unmanned aircraft system (C-UAS) device. The testing device allows an operator, with limited RF knowledge, to conduct testing on a C-UAS device and quickly verify functionality in any location with no data analysis. The testing device provides a simplified and portable method to test the RF output of devices such as C-UAS. Since C-UAS devices use RF power to disrupt their UAS target, the performance can be assessed by verifying the RF power level emitted by the C-UAS device. In order to do this the testing device measures and assesses the RF power levels in the bands that the C-UAS device emits radio frequency energy.

18 Claims, 2 Drawing Sheets

SIMPLIFIED RADIO FREQUENCY EMISSIONS TESTER AND METHOD OF USE THEREOF

RELATED APPLICATIONS

This application is a Non-provisional Application that claims priority benefit of U.S. Provisional Application Ser. No. 62/932,115 filed Nov. 7, 2019, the contents of which are hereby incorporated by reference.

GOVERNMENT INTEREST

The invention described herein may be manufactured, used and licensed by or for the U.S. Government.

FIELD OF THE INVENTION

This invention relates in general to radio frequency emissions testing, and in particular to a simplified and portable radio frequency emissions tester used to measure and validate the radio frequency output of radio frequency emitting devices such as counter-unmanned aerial system devices, which are designed to disable unmanned aerial vehicles and drones.

BACKGROUND OF THE INVENTION

An unmanned aerial vehicle (UAV), commonly known as a drone, is an aircraft without a human pilot on board. UAVs are a component of an unmanned aircraft system (UAS); which include a UAV, a ground-based controller, and a system of communications between the controller and the UAV. The flight of UAVs may operate with various degrees of autonomy, either under remote control by a human operator or autonomously by onboard computers.

UAVs have become a preferred platform for security, reconnaissance, and military operations; and have been introduced into police forces, security forces, and militaries throughout the world. UAV use has also become commonplace for civilian, recreational, and private use as well. In fact, civilian UAVs now vastly outnumber military UAVs. However, the increased affordability and availability of recreational UAV (drone) aircraft has introduced a whole host of new and unprecedented security and privacy concerns. Criminal and terrorist organizations have used UAVs for a wide variety of illegal activity such as spying on law enforcement, intimidating witnesses, smuggling contraband, and dropping explosives. UAVs may also pose a safety concern if they enter restricted airspace in the vicinity of airports or large public gatherings.

Counter-unmanned aircraft system (C-UAS) devices are used to defeat commercial unmanned aircraft systems (UAS) or tactical UAS. A UAS typically consists of a ground control station, data link, and unmanned aerial vehicle (UAV). Commercial UAS generally use industrial, scientific, and medical (ISM) or amateur radio (HAM) frequencies for their data link, while tactical UAS may operate on a wider band of frequencies. To operate properly, the C-UAS device must be matched to the frequency band that the UAS is operating in. In addition to the data link, commercial UAS will often use the Global Positioning System (GPS) for multiple aspects of their functionality including flight planning and UAV control.

Counter-UAS systems are designed to disrupt and break the data link in a UAS by overpowering the data link or jamming the GPS signals that the UAV device is using.

Testing of these counter-UAS disrupting radio frequency (RF) devices over the air requires measuring the frequency spread of, and the power emitted by, the counter-UAS device. This is typically done with high precision measurement devices, like a spectrum analyzer, and high precision antennas. The data from this testing is then analyzed by trained personnel. While this type of testing allows for highly accurate results, it is expensive, physically bulky, and requires technical training.

Thus, there exists a need for testing devices to evaluate operational performance of C-UAS devices that allow an operator, with limited RF knowledge, to test a C-UAS device and quickly verify functionality with no data analysis in any location they have permission to operate.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A radio frequency emissions testing device is provided that includes one or more antennas that acquire radio frequency emissions from a subject device under test, a bandpass filter to exclude irrelevant frequency data from the acquired radio frequency emissions, and, a power detector that determines the average power emitted in the filtered acquired radio frequency emissions. The radio frequency emissions testing device further includes a signal processor that compares the average power emitted to an expected value, and a set of indicators which report results of the comparison to a user.

A method is provided for testing radio frequency emissions from a subject device, such as a Counter-UAS device, with the aforementioned radio frequency emissions testing device. The method includes placing the radio frequency emissions testing device and the subject radio frequency emitting device a pre-specified distance apart from one another, and activating the radio frequency emissions testing device. The bandpass filter of the radio frequency emissions testing device is set to a frequency band of interest that corresponds to the known operating frequency of the subject device being tested, and the subject radio frequency emitting device is activated. A user subsequently watches a set of indicators on the testing device to confirm operation of the subject radio frequency emitting device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein:

DETAILED DESCRIPTION OF EMBODIMENTS OF THE INVENTION

The following description of embodiments of the invention is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-3, 2-4, 3-4, and 1-4.

The invention has utility as a testing device that evaluates the operating performance of a counter-unmanned aircraft system (C-UAS) device. The inventive testing device allows an operator, with limited radio frequency (RE) knowledge, to conduct testing of a C-UAS device and quickly verify functionality with no data analysis in any location they have permission to operate. Inventive embodiments of the testing device, herein referred to as a simplified radio frequency emissions tester (SRT), provide a simplified and portable method to test the radio frequency (RF) output of devices illustratively including C-UAS. Embodiments of the SRT are able to quickly assess the performance of disrupting C-UAS devices. Since disrupting C-UAS devices use RF power to disrupt their target, the performance can be assessed by verifying the power emitted by the C-UAS device. In order to do this the SRT measures and assesses the RF power levels in the bands that the C-UAS device emits radio frequency energy.

Embodiments of the SRT take the basic capabilities of a wideband spectrum analyzer and wideband antenna and simplifies them for the application of testing C-UAS disrupting devices. With prior knowledge of the C-UAS device's operating frequencies, the SRT eliminates the need for a wideband spectrum analyzer and wideband antenna by sectioning off the frequency bands of interest. C-UAS devices generally emit significant RF power in the spectrums in which they are designed to operate, therefore with prior knowledge, in order to collect easily distinguishable signals, the size of the antenna is not overly critical and can be relatively small to increase portability. Furthermore, embodiments of the SRT may utilize common antennas for the frequencies of interest. Each frequency band is tested using a low cost antenna, bandpass filter, and power detector. This makes the SRT device more portable, easier to operate, and less expensive.

Figure 1:
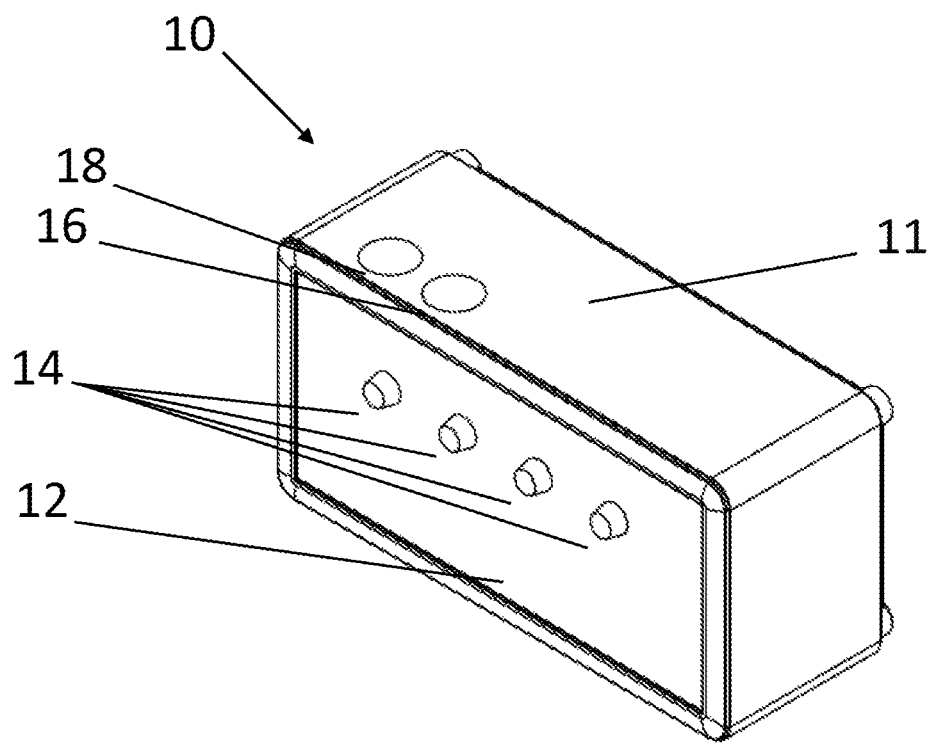
FIG. 1 is a perspective view of an inventive embodiment of a simplified radio frequency emissions tester (SRT)
Figure 2:
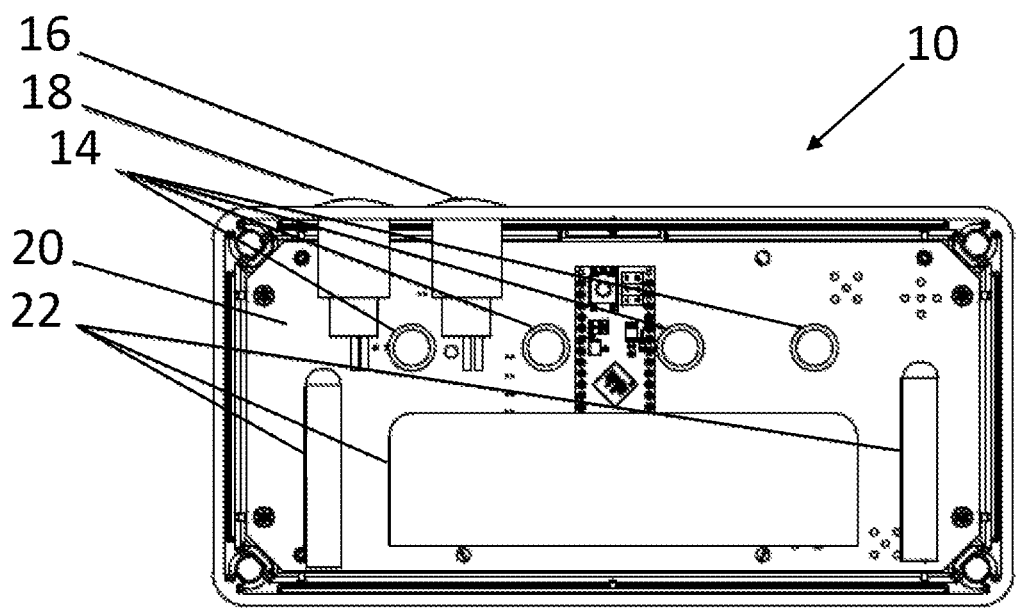
FIG. 2 shows internal components of the SRT with the faceplate removed.
Figure 3:
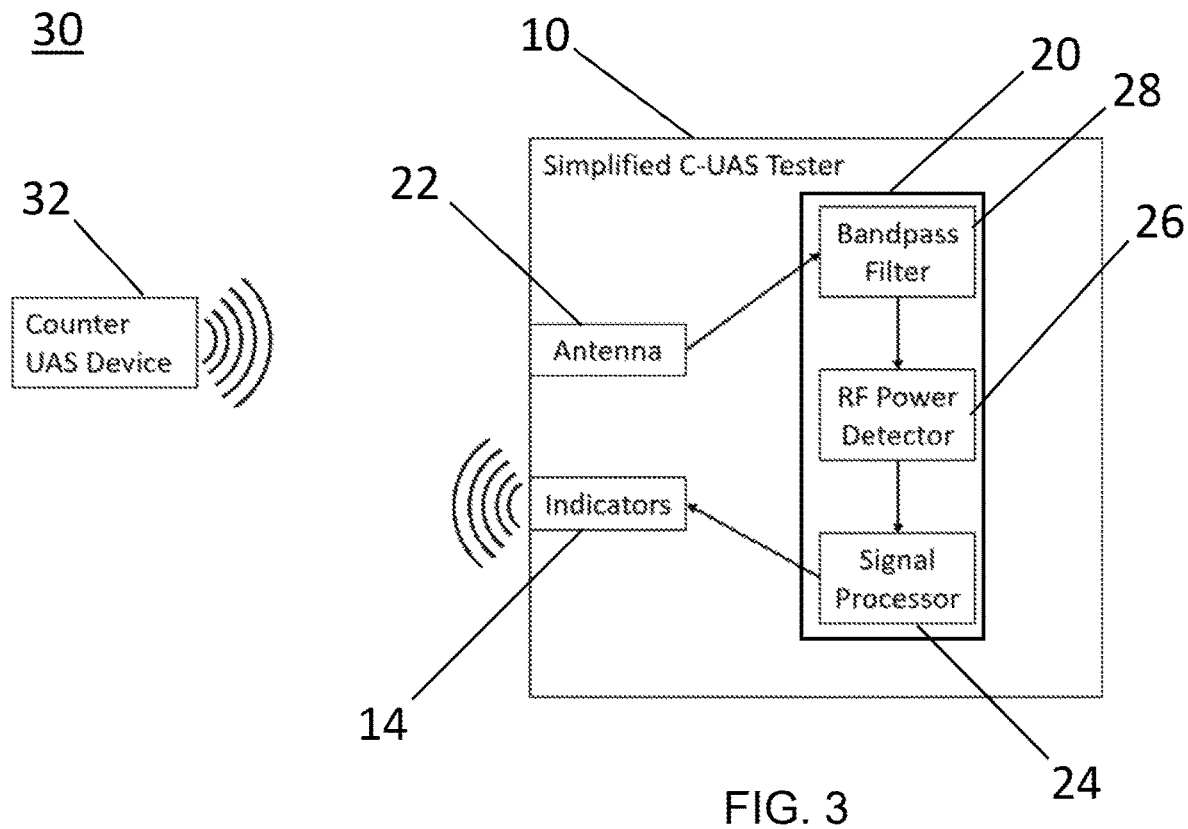
FIG. 3 is a schematic diagram of a testing setup of a counter-unmanned aircraft system (C-UAS) using the SRT of FIG. 1 in accordance with embodiments of the invention.

Referring now to the figures, FIG. 1 is a perspective view of an inventive embodiment of a simplified radio frequency emissions tester (SRT) 10, while FIG. 2 shows internal components of the SRT 10 with the faceplate 12 removed. The portable SRT 10 comprises an enclosure 11 that includes a set of indicator lights 14 that convey information for various functional parameters, and a set of buttons 16 and 18 that in a specific embodiment may be an audio switch and a power switch, respectively. It is appreciated that in additional inventive embodiments, additional buttons and switches may be present illustratively including a band selection switch/control to tune a bandpass filter. An RF shield cover 20 encloses a signal processor 24, RF power detector circuitry 26, and a bandpass filter 28 as shown in FIG. 3. One or more antennas 22 may be individually optimized or tuned to specific frequency bands. A power source for the SRT 10 may include a plugin external AC/DC adaptor, a built in AC/DC transformer with an external AC plug, or a rechargeable battery that may or may not need to be removed from the enclosure to charge.

In operation, the one or more antennas 22 collect RF emissions, and the bandpass filter 28 excludes irrelevant frequency data from the collected RF emissions. The power detector 26 determines the average power emitted from the filtered RF emissions, and the signal processor 24 compares the average power emitted by the C-UAS 32 to an expected value. Once this is completed, the SRT device 10 reports the result using the indicators 14 to the operator.

Continuing with the measurement system 30 of FIG. 3, when RF emissions from the C-UAS 32 are received, the SRT 10 uses a RF filter made up of an inductor and capacitor (LC) to from bandpass filter 28 to filter out any noise that the antenna 22 may have picked up outside of the frequency band of interest. In a specific inventive embodiment, the bandpass filter 28 may be tunable to a specific operating frequency of the C-UAS 32. The band selected signal is then passed to an RF power detector module 26. The RF power detector module 26 converts the RF signal to an analog voltage. The analog voltage is then compared to a set threshold value in the signal processor 24 for the C-UAS device under study. The voltage comparison may illustratively be done via an analog comparator circuit, or with digital logic circuits that may be a part of the signal processor 24. Once the comparison is completed, a positive response, via audial or visual indicators 14 will be activated if the threshold value is met.

The pre-set voltage levels are set so that only the specific frequency band of interest will trigger the threshold voltage. It is noted that due to the nature of RF filters, a percentage of irrelevant data will pass through the filter and an improper setting of the voltage could result in false positives. It is also important that the SRT device 10 is located far enough away from the C-UAS 32 device that false positives don't occur due to the same behavior. This is critical if a C-UAS device has different power levels on different bands.

Figure 4:
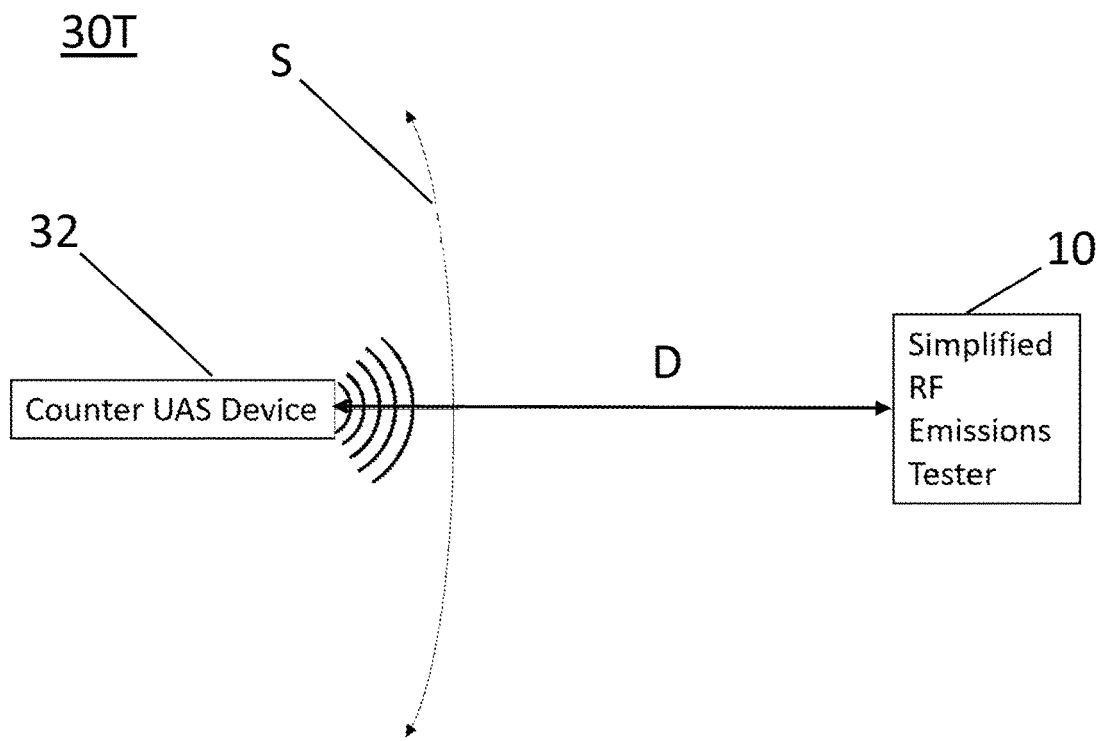
FIG. 4 is a schematic representation of a testing procedure of a C-UAS using the SRT in accordance with embodiments of the invention.

FIG. 4 illustrates a test set up 30T using embodiments of the SRT 10 to measure RF emissions from the C-UAS 32 under test. During C-UAS testing with the SRT 10, the C-UAS device 32 is located a pre-specified rough distance D from the SRT 10 and both devices are powered on. The SRT will begin sending positive test responses if the pre-set threshold power levels are met. In order to avoid false positives, either turn the transmitter of the C-UAS device 32 off and back on or move the C-UAS device 32 in a sweeping pattern S away from the SRT 10 to verify functionality of both devices. This can be done multiple times to verify the absence of false positive results.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular embodiments of the invention, but is not meant to be a limitation upon the practice thereof. The following claims, including all equivalents thereof, are intended to define the scope of the invention.

The invention claimed is:

1. A radio frequency emissions testing device, said device comprising:
   one or more antennas that are adapted to acquire radio frequency emissions from a subject device under test, wherein the subject device under test is a counter-unmanned aircraft system (C-UAS) device;
   a bandpass filter adapted to exclude irrelevant frequency data from the acquired radio frequency emissions and yield a filtered emission;
   a power detector adapted to determine an average power emitted in the filtered emission;
   a signal processor adapted to compare the average power emitted to an expected power value for the filtered emission; and
   a set of indicators to report results of the comparison between the average power emitted to an expected power value for the filtered emission.

2. The device of claim 1, wherein the bandpass filter comprises an inductor and a capacitor.

3. The device of claim 1, wherein the bandpass filter is tunable.

4. The device of claim 3, wherein the bandpass filter is tunable to a specific operating frequency of the C-UAS device under test and the selected band signal is then passed to the power detector.

5. The device of claim 1, wherein the power detector converts the radio frequency emission to an analog voltage and the signal processor compares the analog voltage to a set threshold value.

6. The device of claim 1, wherein the signal processor comprises an analog comparator circuit or a digital logic circuit.

7. The device of claim 1, wherein the set of indicators are visual indicators.

8. The device of claim 1, wherein the set of indicators are audio indicators.

9. The device of claim 1, further comprising a button or a switch for tuning the bandpass filter or activating an audio signal.

10. A method of testing a radio frequency (RF) emitting device, the method comprising:
    placing the RF emitting device and an RF emissions testing device apart from one another at a pre-specified distance, wherein said RF emissions testing device comprises one or more antennas that are adapted to acquire radio frequency emissions; a bandpass filter adapted to exclude irrelevant frequency data from the acquired radio frequency emissions and yield a filtered emission; a power detector adapted to determine an average power emitted in the filtered emission; a signal processor adapted to compare the average power emitted to an expected power value for the filtered emission; and a set of indicators to report results of the comparison between the average power emitted to an expected power value for the filtered emission;
    activating the RF emissions testing device;
    setting the bandpass filter of the RF emissions testing device to a frequency band of interest that corresponds to the known operating frequency of the RF emitting device;
    activating the RF emitting device; and
    observing the indicators of the RF emissions testing device to confirm operation of the RF emitting device.

11. The method of claim 10, wherein the RF emitting device is a counter-unmanned aircraft system (C-UAS) device.

12. The method of claim 10, further comprising moving the RF emitting device in a sweeping pattern away from the radio frequency emissions testing device.

13. The method of claim 10, wherein the bandpass filter comprises an inductor and a capacitor.

14. The method of claim 10, wherein the bandpass filter is tunable.

15. The method of claim 10, wherein the power detector converts the radio frequency emission to an analog voltage and the signal processor compares the analog voltage to a set threshold value.

16. The method of claim 10, wherein the signal processor comprises an analog comparator circuit or a digital logic circuit.

17. The method of claim 10, wherein the set of indicators are visual indicators.

18. The method of claim 10, wherein the set of indicators are audio indicators.

* * * * *